United States Patent [19]

Tsugai

[11] Patent Number: 5,751,154
[45] Date of Patent: May 12, 1998

[54] CAPACITIVE SENSOR INTERFACE CIRCUIT

[75] Inventor: Masahiro Tsugai, Tokyo, Japan

[73] Assignee: Mitsubishi Denki Kabushiki Kaisha, Tokyo, Japan

[21] Appl. No.: 739,049

[22] Filed: Oct. 28, 1996

[30] Foreign Application Priority Data

Mar. 19, 1996 [JP] Japan ................................. 8-076323

[51] Int. Cl.⁶ ................................................ G01P 15/125
[52] U.S. Cl. ........................................ 324/661; 73/514.32
[58] Field of Search ........................... 73/514.32, 514.36, 73/514.16; 324/661, 672, 678, 686, 162

[56] References Cited

U.S. PATENT DOCUMENTS

| | | | |
|---|---|---|---|
| 5,429,736 | 7/1995 | Shimada et al. | 73/514.32 X |
| 5,612,494 | 3/1997 | Shibano | 73/514.32 |

FOREIGN PATENT DOCUMENTS 002706038  12/1994  France ................. 73/514.32

OTHER PUBLICATIONS

"An ASIC for High–Resoilution Capacitive Microaccelerometerss", Sensors and Actuators, A21–A23, pp. 278–281, 1990.

*Primary Examiner*—Michael Brock
*Attorney, Agent, or Firm*—Sughrue, Mion, Zinn, Macpeak & Seas, PLLC

[57] ABSTRACT

In a switched-capacitor type interface circuit connected to a capacitive sensor having two capacitors (C1, C2) whose value is variable, the interface circuit includes an operational amplifier (A1) with an output terminal and an inverting input terminal between which a feedback/sampling capacitor (C3) is connected, and a holding capacitor (C4) connected between the operational amplifier (A1) and a reference voltage source. The capacitors (C1, C2, C3) have one ends connected to the inverting input terminal of the operational amplifier (A1). The other ends of the capacitors (C1, C2) are connected to a power source and the capacitor (C3) is concurrently short-circuited depending upon predetermined timing, and the other ends of the and capacitors (C1, C2) and the output terminal of the operational amplifier (A1) are respectively connected to a non-inverting input terminal of the operational amplifier (A1) after the elapse of a predetermined time from the predetermined timing.

4 Claims, 6 Drawing Sheets

CAPACITIVE SENSOR INTERFACE CIRCUIT

BACKGROUND OF THE INVENTION

1. Field of the Invention

The present invention relates to a capacitive sensor interface circuit for use in a capacitance detecting sensor such as acceleration sensor or angular velocity sensor used to measure vibration, control a vehicle or control movement.

2. Description of the Prior Art

In an inertia force sensor to detect, for example, acceleration or angular velocity applied to a moving object, in recent years, a special attention has been focused on an acceleration sensor and an angular velocity sensor to calculate acceleration by detecting a variation in capacity of a capacitor as a sensor employing a micro-machining technique for semiconductor. These sensors have advantages of smaller devices, capability of mass production, higher accuracy, higher reliability, and so forth.

Figure 5:
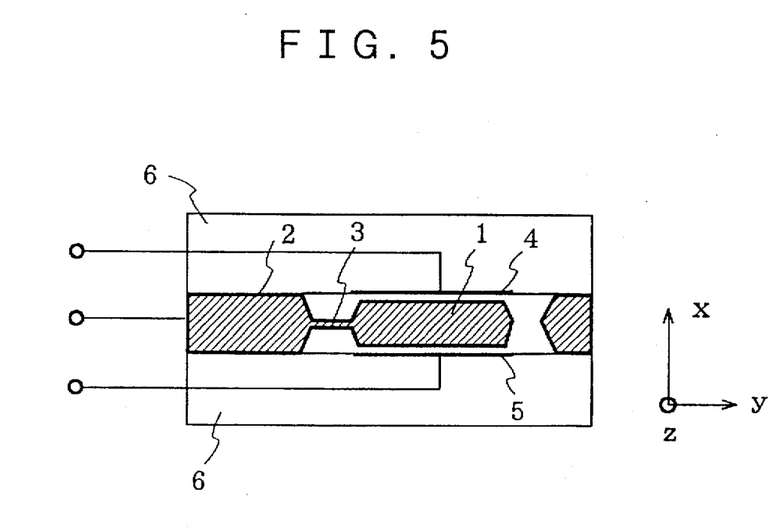
FIG. 5 is a diagram showing a structure of one illustrative conventional capacitive acceleration sensor.
Figure 6:
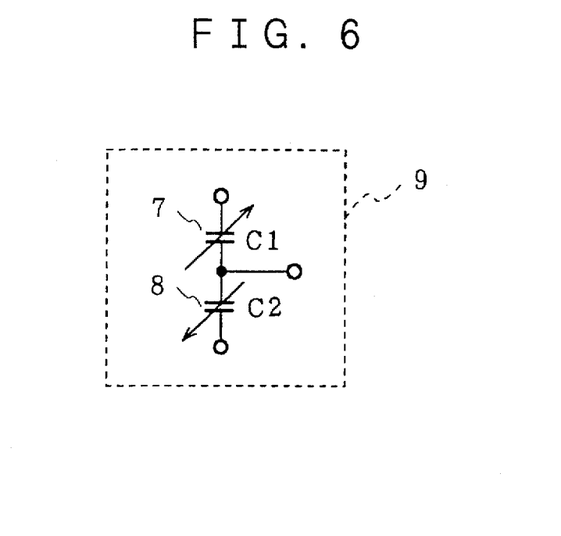
FIG. 6 is a circuit diagram showing an equivalent circuit of the conventional capacitive acceleration sensor.

FIG. 5 is a diagram showing a structure of a typical capacitive acceleration sensor manufactured by employing the micro-machining process for semiconductor. In the structure, a silicon mass body 1 is supported by an anchor portion 2 through a beam 3. Above and below the mass body 1, fixed electrodes 4 and 5 are formed on glass or silicon 6. The mass body 1 and the fixed electrodes 4, 5 form capacitors 7 and 8 shown in FIG. 6. The capacitors 7 and 8 form a sensor element 9.

When inertia force is exerted by acceleration on the mass body 1 in a direction x, the mass body 1 is displaced by u in the direction x. Between the mass body 1 and the fixed electrodes 4 and 5, the displacement u increases one capacitance value (i.e., C+ΔC), and decreases the other capacitance value (i.e., C−ΔC). The acceleration sensor converts the variations in capacitance value into voltage output.

Figure 7:
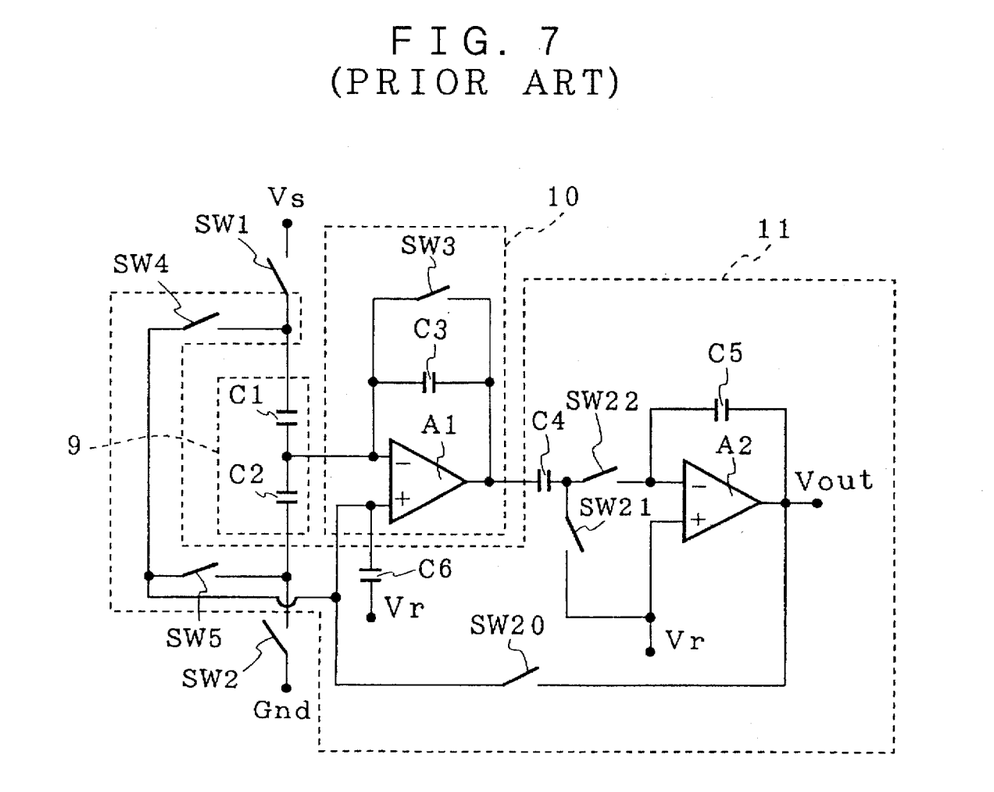
FIG. 7 is a circuit diagram showing one illustrative conventional capacitive sensor interface circuit.
Figure 8:
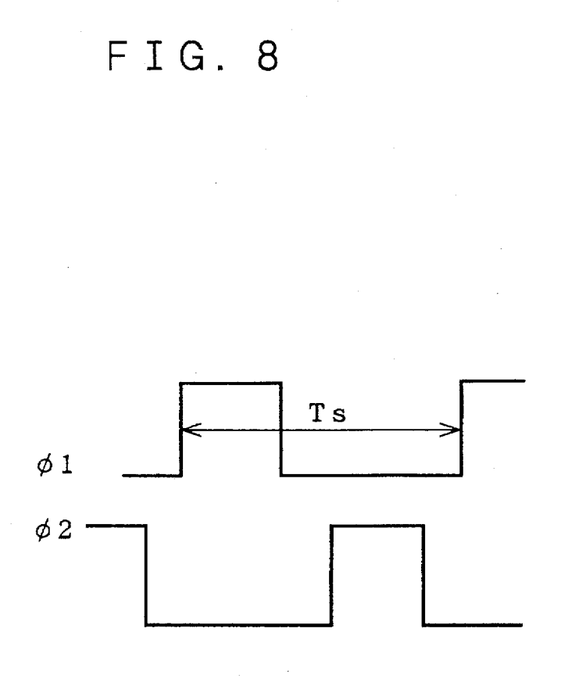
FIG. 8 is an explanatory view showing clock timing used to drive a switch of the conventional capacitive sensor interface circuit.

As a method of converting the variation in capacitance value according to the displacement of the mass body 1 into the voltage output, an illustrative interface circuit using a switched-capacitor circuit is disclosed in, for example, "An Asic for High-resolution Capacitive Micro-accelerometers," Rudlf et al. in Sensor & Actuator, A21–A23, pp.278–281 (1990). FIG. 7 is a circuit diagram showing one illustrative capacitive sensor interface circuit using the conventional switched-capacitor circuit. FIG. 8 is a time chart showing timing of clock signals $\phi 1$ and $\phi 2$ for the switches.

Switches SW1 and SW2 are closed according to timing at which the clock signal $\phi 1$ makes a LOW to HIGH transition, thereby respectively connecting power source voltage Vs and ground (Gnd) across the sensor element 9. At the time, error charge ΔQ according to a difference between capacitance of a capacitor C1 and capacitance of a capacitor C2 is sampled by a subsequent switched-capacitor circuit 10. Further, a switch SW22 is closed according to timing at which the clock signal $\phi 1$ makes the LOW to HIGH transition, thereby generating error voltage Vm ($=V_{out}-Vr$) according to the error charge ΔQ. When a switch SW21 is closed according to timing at which the clock signal $\phi 2$ makes a LOW to HIGH transition, the generated error voltage is held by a capacitor C5 through a subsequent voltage hold/feedback circuit 11, and the error voltage Vm is fed back to a capacitor C6. As a result, in a first stage operational amplifier A1 forming the switched-capacitor circuit 10, a potential of a non-inverting input terminal fluctuates with respect to reference voltage Vr according to sign of the error charge ΔQ. The error voltage Vm gradually changes for each switching cycle, and becomes a constant value expressed by the following expression (1) when the error charge ΔQ is zero, that is, when the same charge can continuously be accumulated in the capacitor C1 and the capacitor C2:

$$V_{out}=\{C1/(C1+C2)\}\cdot Vs+\{C3/(C1+C2)\}\cdot V_{os}=(C1\cdot Vs+V_{os}\cdot C3)/(C1+C2) \quad (1)$$

where $V_{os}$ means input offset voltage, for convenience, shared by the first stage operational amplifier and a second stage operational amplifier, and Vr is set as Vr=Vs/2.

The above discussion is based on the precondition that the circuit is driven by a single power source Vs. However, depending upon another precondition that the circuit is driven by two positive and negative power sources with ±Vs/2, the expression (1) can be rewritten with Vr at the potential of zero, resulting in the following expression (2):

$$V_{out}=\{C1-C2)/(C1+C2)\}\cdot Vs/2+\{C3/(C1+C2)\}\cdot V_{os} \quad (2)$$

As shown in the expression (1) or (2), the output voltage $V_{out}$ can be expressed by the sum of output voltage according to the difference in capacitance C1–C2 depending on the displacement of the mass body 1 by the acceleration, and DC offset voltage according to the input offset voltage $V_{os}$ of the operational amplifier.

On the other hand, for feedback of the error voltage Vm, it is necessary to meet the following expression (3) as a condition for stability:

$$\frac{C_0}{1-\left(\frac{C1-C2}{C1+C2}\right)^2}\cdot\frac{C4}{C3\cdot C5}<1 \quad (3)$$

where $C_0$ means initial capacitance (C1=C2=$C_0$) of the capacitors C1 and C2 when the difference in capacity C1–C2 depending on the displacement of the mass body 1 according to the acceleration is zero.

As stated above, in the prior art, it is necessary to concurrently set C3 lower and $C_0$ higher in order to reduce the DC offset voltage. However, if C3 is set lower, there is a disadvantage in that, for example, stability (convergence) is reduced because the condition for the stability expressed by the expression (3) can not be met.

Further, the operational amplifiers respectively have different input offset voltages $V_{os}$ which vary according to the temperature. Thus, a similar variation, and similar temperature dependence can be observed in DC offset voltage expressed by the second term of the expression (1).

Since the conventional capacitance detecting circuit has the above structure, there is generated the DC offset voltage decided by the input offset voltage $V_{os}$ of the operational amplifier, the capacitance value of the capacitor C3, and the entire capacity C1+C2 of the sensor element. The DC offset voltage varies according to the temperature, and causes an offset temperature drift. Thus, there is a problem in that, for example, an SN ratio of the sensor becomes worse.

Further, in the circuit structure, the four capacitors (C3 to C6) are required as passive elements, and the at least two operational amplifiers are required as active elements. Consequently, there is another problem in that a circuit area of a semiconductor integrated circuit is increased to make an IC chip larger, resulting in higher cost of the integrated circuit.

Further, a self-diagnosis function is typically desired for the acceleration sensor to check whether or not the mass body 1 serving as a movable electrode is normally displaced. However, in order to add the self-diagnosis function, it is necessary to additionally mount one fixed electrode for the self-diagnosis on a surface opposed to the movable electrode. As a result, there are further problems in that an increased constraint is imposed on design of the capacitive sensor, and the sensor can not easily be made smaller.

SUMMARY OF THE INVENTION

In order to overcome the above problems, it is an object of the present invention to provide a capacitive sensor interface circuit having a simple structure at a lower cost.

It is another object of the present invention to provide a capacitive sensor interface circuit at a lower cost, in which DC offset voltage outputted from a capacitance detecting circuit and an offset temperature drift thereof can be reduced.

It is a further object of the present invention to provide a capacitive sensor interface circuit in which a potential applied to a self-diagnosis electrode can be applied between a mass body and a fixed electrode without an additional self-diagnosis fixed electrode, and an efficient self-diagnosis can be made in a simple structure.

According to the present invention, for achieving the above-mentioned objects, there is provided a capacitive sensor interface circuit connected to a capacitive sensor having first and second capacitors whose at least any one value is variable, including an operational amplifier with an output terminal and an inverting input terminal between which a feedback/sampling capacitor is connected, and a holding capacitor connected between the operational amplifier and a reference voltage source. In the capacitive sensor interface circuit, the first and second capacitors and the feedback/sampling capacitor have one ends connected to the inverting input terminal of the operational amplifier. Depending upon predetermined timing, the other ends of the first and second capacitors are connected to a power source and the feedback/sampling capacitor is concurrently short-circuited. Further, after the elapse of a predetermined time from the predetermined timing, the other ends of the first and second capacitors and the output terminal of the operational amplifier are respectively connected to a non-inverting input terminal of the operational amplifier.

Further, according to one preferred embodiment of the present invention, the other end of a feedback/sampling capacitor is disconnected from an output terminal of an operational amplifier and is concurrently connected to a non-inverting input terminal of the operational amplifier depending on predetermined timing, and is connected to the output terminal of the operational amplifier after the elapse of a predetermined time from the predetermined timing.

Further, according to another preferred embodiment of the present invention, self-diagnosis voltage is forcedly applied to a first or second capacitor of a capacitive sensor.

The above and further objects and novel features of the invention will more fully appear from the following detailed description when the same is read in connection with the accompanying drawings.

DETAILED DESCRIPTION OF THE PREFERRED EMBODIMENTS

According to preferred embodiments of the present invention, a capacitive sensor interface circuit will be described hereinafter. In the accompanying drawings, the same reference numerals mean identical or equivalent component parts.

Figure 1:
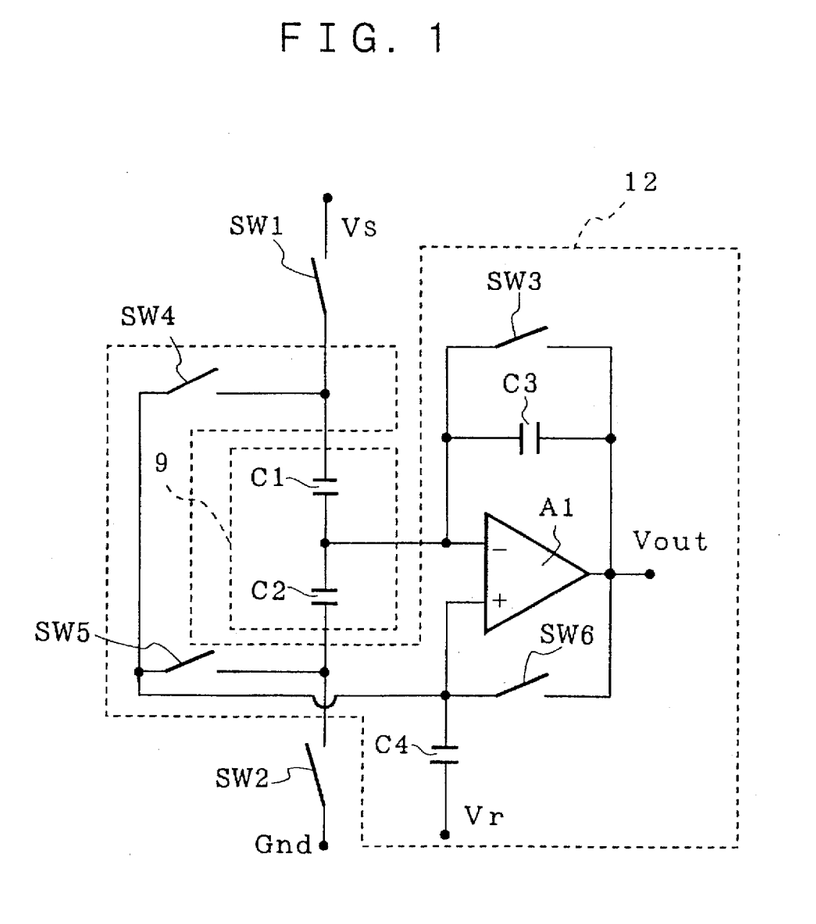
FIG. 1 is a circuit diagram showing a capacitive sensor interface circuit according to the first embodiment of the present invention.

FIG. 1 is a circuit diagram showing a capacitance detecting circuit including a capacitive sensor interface circuit according to the first embodiment of the present invention. The circuit has a sensor element 9, an operational amplifier A1, a feedback/sampling capacitor C3, and a holding capacitor C4. The one operational amplifier A1, the feedback/sampling capacitor C3, and the holding capacitor C4 form a switched-capacitor and voltage hold/feedback circuit 12.

In the circuit, reference voltage is Vr (=Vs/2) as in the prior art, and error voltage Vm gradually approaches output voltage $V_{out}$.

Switches SW1 and SW2 are closed according to timing at which a clock signal $\phi 1$ shown in FIG. 8 makes a LOW to HIGH transition, thereby accumulating charge in capacitors C1 and C2 of the sensor element 9. Further, a switch SW3 is also closed according to timing at which the clock signal $\phi 1$ makes the LOW to HIGH transition, and short circuit occurs across the feedback/sampling capacitor C3. Subsequently, switches SW4, SW5, and SW6 are closed according to timing at which a clock signal $\phi 2$ makes a LOW to HIGH transition, thereby connecting terminals of the capacitors C1 and C2, which are not connected to the operational amplifier A1, and an output terminal of the operational amplifier A1 to a non-inverting input terminal of the operational amplifier A1. Thus, the switched-capacitor and voltage hold/feedback circuit 12 converts a difference ΔQ between accumulated charge in the capacitor C1 and accumulated charge in the capacitor C2 into a potential difference ΔV through the feedback capacitor C3 of the operational amplifier and a capacitor serving as the sum of C1 and C2. At the time, the output terminal of the operational amplifier is connected to the non-inverting input terminal of the operational amplifier depending upon the same timing as that of the clock signal $\phi 2$. Hence, the potential difference ΔV is fed to the operational amplifier as a potential difference between an inverting input terminal and the non-inverting input terminal. As a result, output of the operational amplifier fluctuates according to sign of the potential difference ΔV (i.e., magnitude of V+ or V−). Further, charge flows from the operational amplifier into the capacitor C4, or charge flows out of the capacitor C4 according to a potential of $V_{out}$. Depending on the timing at which the clock signal $\phi 1$ makes the LOW to HIGH transition, voltage developed across the capacitor C4 can be held at the same potential as that immediately before the clock signal φ2 is switched over to LOW. After repetition of the above operation, voltage of the inverting input terminal and the non-inverting input terminal of the operational amplifier A1 become a constant value of voltage by which the same charge can be accumulated in the capacitor C1 and the capacitor C2 as in the expression (1).

That is, the same function as that in the prior art can be realized by the simple structure having the one operational amplifier A1, the sensor element 9, the feedback/sampling capacitor C3, and the holding capacitor C4. However, when input offset voltage $V_{os}$ is developed across the input terminals of the operational amplifiers A1, offset output voltage expressed by the expression (1) is generated.

Figure 2:
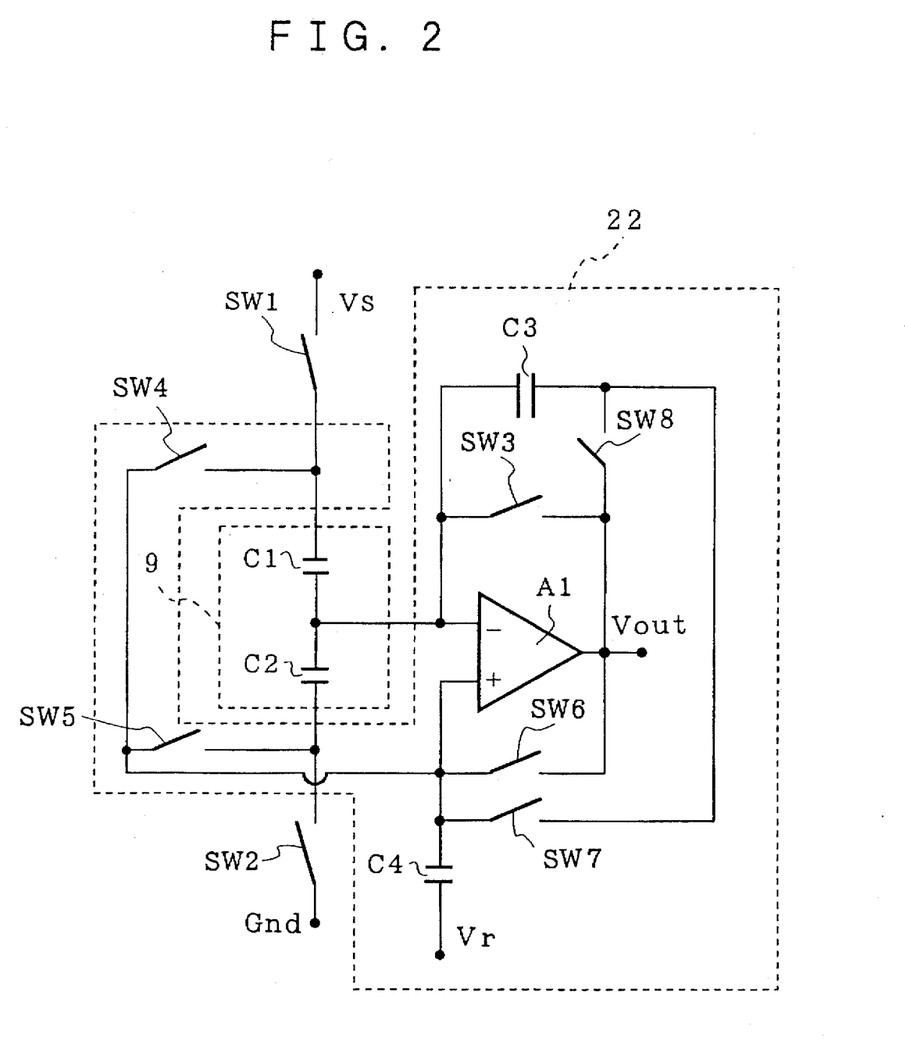
FIG. 2 is a circuit diagram showing a capacitive sensor interface circuit according to the second embodiment of the present invention.

FIG. 2 shows a capacitive sensor interface circuit according to the second embodiment of the present invention. The capacitive sensor interface circuit according to the second embodiment has a basic structure identical with the structure according to the first embodiment shown in FIG. 1 except that the former has the function of compensating for input offset voltage $V_{os}$ of an operational amplifier.

According to timing at which a clock signal φ1 makes a LOW to HIGH transition, switches SW1 and SW2 are closed, and switches SW3 and SW7 are concurrently closed. In a feedback capacitor/sampling capacitor C3 of the operational amplifier A1, charge Q3 is accumulated by $V_{os}$. On the other hand, charges Q1, Q2 are respectively accumulated in capacitors C1, C2 forming a sensor element 9. The charges Q1, Q2, and Q3 can be given by the following expressions:

$$Q1 = [Vs - (V_{os} + Vm)] \cdot C1 \quad (4)$$

$$Q2 = [V_{os} + Vm] \cdot C2$$

$$Q3 = V_{os} \cdot C3$$

where Vm means a potential of a non-inverting input terminal of the operational amplifier A1 at the timing at which the clock signal φ1 makes the LOW to HIGH transition, and Vs is input power source voltage.

According to timing at which a clock signal φ2 makes a LOW to HIGH transition, switches SW4, SW5, SW6, and SW8 are closed, and the capacitor C3 is connected to the capacitors C1 and C2, resulting in total capacity of C1+C2+C3. When an amount of charge accumulated in the capacitors C1 to C3 reaches $V_{os}$ as voltage developed across the inverting input terminal and the non-inverting input terminal of the operational amplifier A1, output of the operational amplifier becomes a constant value $V_{out}$. Hence, the following expression can be held:

$$V_{os} = (Q1 - Q2 + Q3)/(C1 + C2 + C3) \quad (5)$$

When rearrangement is made after the expression (4) is substituted into the expression (5), $$V_{out} = [C1/(C1+C2)] \cdot Vs \quad (6)$$

As a result, the output voltage $V_{out}$ of the operation amplifier is not affected by $V_{os}$ in theory.

As stated above, in the embodiment, the output voltage does not include the term which depends upon the input offset voltage $V_{os}$ of the operational amplifier A1. Therefore, it is possible to prevent the output from varying according to a variation in $V_{os}$ due to a variation in temperature, and provide an interface circuit for the capacitance detecting sensor having extremely stable DC offset output.

That is, only desired error charge can be accumulated in the sampling capacitor, and the voltage of the non-inverting input terminal can be decided in response to the result. As a result, it is possible to prevent the output from being affected by the input offset voltage $V_{os}$ across the non-inverting input terminal and the inverting input terminal of the operational amplifier.

Figure 3:
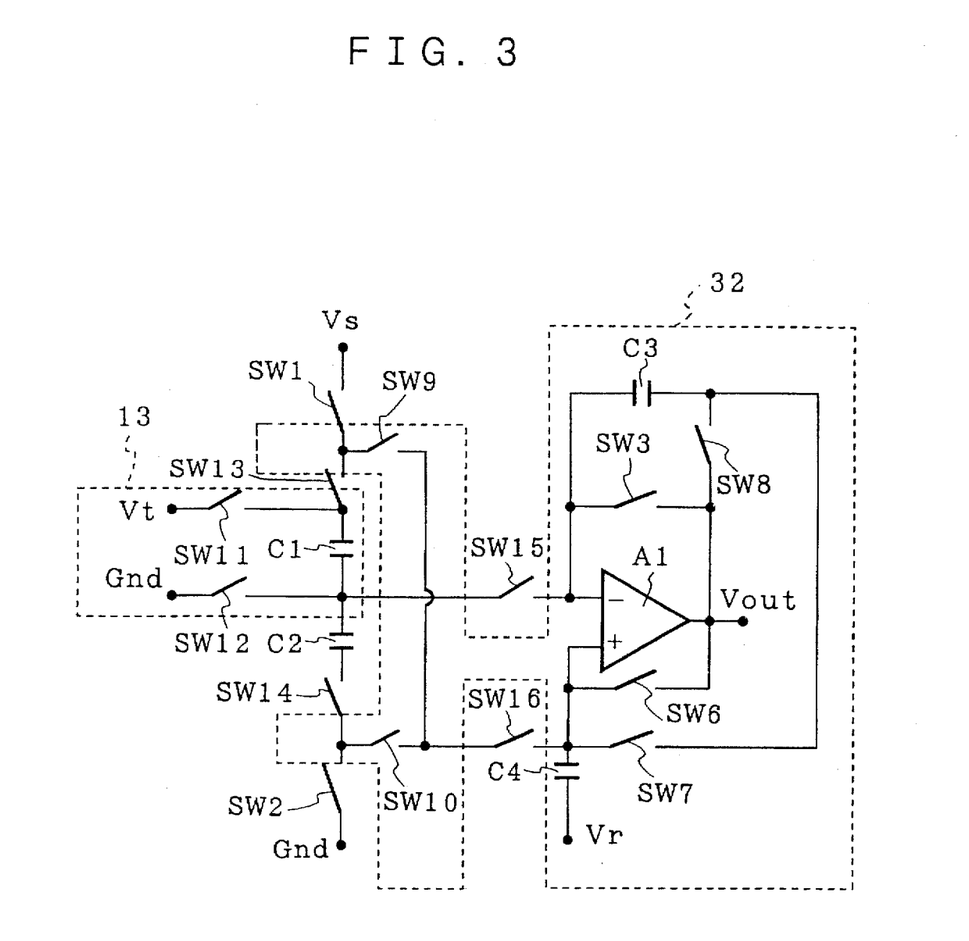
FIG. 3 is a circuit diagram showing a capacitive sensor interface circuit according to the third embodiment of the present invention.
Figure 4:
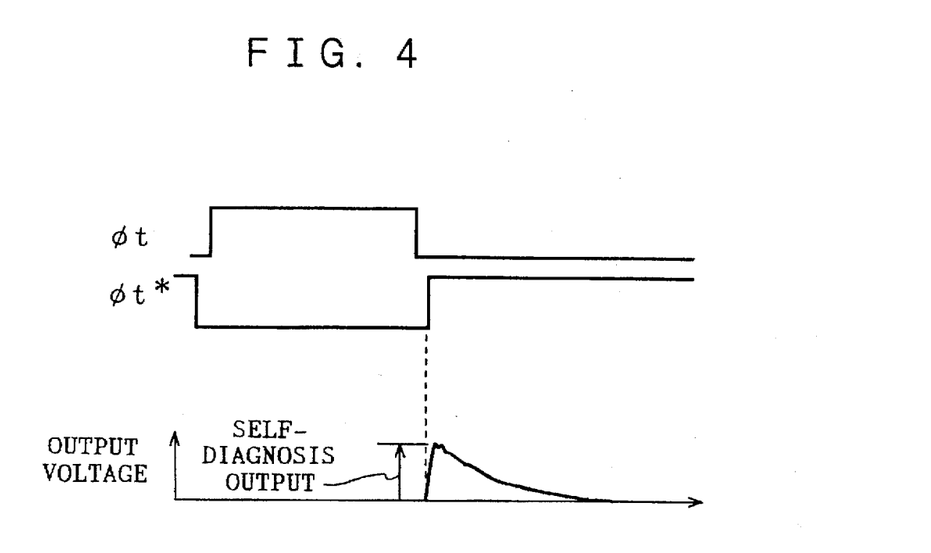
FIG. 4 is an explanatory view showing clock timing used to drive a switch for a self-diagnosis of the capacitive sensor interface circuit shown in FIG. 3, and a self-diagnosis waveform outputted in synchronization therewith.

FIG. 3 shows the third embodiment of an interface circuit for a capacitance detecting sensor of the present invention, in which a mass body is driven by electrostatic force, and a self-diagnosis function is additionally provided to check displacement of the mass body. FIG. 4 is a timing chart of pulses used for a self-diagnosis. When a pulse $\Phi_t$ for the self-diagnosis makes a LOW to HIGH (ON) transition, switches SW11 and SW12 are closed, thereby applying driving voltage Vt between a fixed electrode and the mass body forming a capacitor C1. Thus, the mass body is attracted and displaced by the electrostatic force toward the fixed electrode. At the time, switches SW13, SW14, SW15, and SW16 are off because the switches are set to be closed when a pulse $\Phi_t^*$ is HIGH. Consequently, a switched-capacitor/feedback circuit 13 is disconnected from a sensor element 9, and output of the detecting circuit becomes reference voltage Vr.

On the other hand, when the pulse $\Phi_t$ makes a HIGH to LOW transition, and the pulse $\Phi_t^*$ makes a LOW to HIGH transition, the switches SW13, SW14, SW15, and SW16 are on, and the switches SW11 and SW12 are off. That is, the detecting circuit is switched over to a normal detecting phase (displacement detecting mode) to output output voltage $V_{out}$ according to charged states of capacitors C1 and C2. In this case, a cycle Ts of a sampling clock of the detecting circuit is set to be extremely lower than response time constants of the mass body and the switched-capacitor circuit. Hence, it is possible to monitor the displacement of the mass body for a time period from a release from the electrostatic force by the driving voltage to a return to a neutral point as a transient waveform of the output voltage of the detecting circuit. As a result, it is possible to check whether or not the operation of the mass body is normal by using the output waveform as self-diagnosis output.

That is, the fixed electrode can be used as a self-diagnosis electrode, and a drive potential itself can be fed as a potential difference between the fixed electrode and the mass body.

It must be noted that the present invention should not be limited to the above embodiment. For example, it is also possible to use a more stable potential of the inverting input terminal of the operational amplifier as the output of the detecting circuit. Further, a low-pass filter or an amplifier may be mounted in a subsequent stage in order to remove noise generated during switching and adjust a gain.

Further, a high-pass filter may be mounted to cut a low-frequency signal. Alternatively, a switched-capacitor filter may be used as the filters.

As set forth above, the following effects can be provided according to the present invention.

According to the preferred embodiment of the present invention, there is provided the switched-capacitor type interface circuit including the operational amplifier A1 with the output terminal and the inverting input terminal between which the feedback/sampling capacitor C3 is connected, and the holding capacitor C4 connected between the operational amplifier A1 and the reference voltage source. The capacitors C1, C2 forming the capacitive sensor, and the feedback/sampling capacitor C3 have the one ends connected to the inverting input terminal of the operational amplifier A1. When the clock signal φ1 makes the HIGH to LOW transition, the other ends of the capacitors C1 and C2 are connected to the power source and the capacitor C3 is concurrently short-circuited. When the clock signal φ2 makes the HIGH to LOW transition after the elapse of the predetermined time from the transition of the clock signal φ1, the other ends of the capacitors C1 and C2 and the output terminal of the operational amplifier A1 are respectively connected to the non-inverting input terminal of the operational amplifier A1. Thus, in the interface circuit, the only one operational amplifier is required as the active element, and the two capacitors C3 and C4 are required as the passive elements in addition to the capacitors C1 and C2 forming the sensor element. Therefore, it is possible to provide the interface circuit having the extremely simple structure. As a result, there is an advantage in that the capacitive sensor interface circuit can be provided at a lower cost even when the circuit is used as an application-specific integrated circuit (ASIC).

Further, according to another preferred embodiment of the present invention, the other end of the feedback/sampling capacitor C3 is disconnected from the output terminal of the operational amplifier A1 and is concurrently connected to the non-inverting input terminal of the operational amplifier A1 depending on the timing of the clock signal φ1, and is connected to the output terminal of the operational amplifier A1 depending upon the timing of the clock signal φ2. Thus, it is possible to determine the output voltage according to the displacement of the movable electrode without the effect of the input offset voltage of the operational amplifier. As a result, there is an advantage in that it is possible to provide the highly accurate and highly stable capacitive sensor interface circuit without the effect of the variation in input offset voltage of the operational amplifier due to the variation in temperature.

Further, according to another preferred embodiment of the present invention, the self-diagnosis voltage is forcedly applied to the capacitor C1 or C2 of the capacitive sensor. Without an additional fixed electrode for the self-diagnosis, the self-diagnosis driving voltage can directly be used as the electrostatic force for the mass body. As a result, there is an advantage in that it is possible to provide the capacitive sensor interface circuit in which an efficient self-diagnosis can be made.

What is claimed is:

1. A capacitive sensor interface circuit connected to a capacitive sensor having first and second capacitors, wherein at least one of said capacitors is a variable capacitor, and the capacitive sensor interface circuit comprising:

a single operational amplifier;

a feedback/sampling capacitor connected between an output terminal and an inverting input terminal of said operational amplifier; and a holding capacitor connected between a non-inverting input terminal of said operational amplifier and a reference voltage source, wherein the first and second capacitors and the feedback/sampling capacitor have one, common end connected to the inverting input terminal of the operational amplifier, another, opposite end of the first capacitor being connected to a first power source, another opposite other end of the second capacitor being connected to a second power source, the feedback/sampling capacitor being short-circuited concurrently by a first switching means depending upon predetermined timing, and said opposite ends of the first and second capacitors and the output terminal of the operational amplifier being connected to a non-inverting input terminal of the operational amplifier by a second switching means after the elapse of a predetermined time from the predetermined timing.

2. A capacitive sensor interface circuit according to claim 1, wherein the other end of the feedback/sampling capacitor is concurrently connected to the non-inverting input of the operational amplifier by a third switching means depending on the predetermined timing, and is connected to the output terminal of the operational amplifier by a fourth switching means after the elapse of the predetermined time from the predetermined timing.

3. A capacitive sensor interface circuit according to claim 1, further comprising a self-diagnosis voltage source, wherein self-diagnosis voltage is applied by a fifth switching means to the first or second capacitor of the capacitive sensor upon predetermined timing.

4. A capacitive sensor interface circuit according to claim 2, further comprising a self-diagnosis voltage source, wherein self-diagnosis voltage is applied by a sixth switching means to the first or second capacitor of the capacitive sensor upon predetermined timing.

* * * * *